Patented Apr. 3, 1951

2,547,048

UNITED STATES PATENT OFFICE 2,547,048

PROCESS FOR MANUFACTURE OF PYRIDYL-3-CARBINOL

Reinhard Schläpfer, Basel, Switzerland, assignor to Hoffmann-La Roche Inc., Nutley, N. J., a corporation of New Jersey No Drawing. Application April 23, 1947, Serial No. 743,461. In Switzerland June 4, 1946

8 Claims. (Cl. 260—297)

The present invention relates to the manufacture of pyridyl-3-carbinol.

Pyridyl-3-carbinol is not easily obtainable. Dehnel (Berichte der Deutschen Chemischen Gesellschaft, vol. 33, year 1900, p. 3498) appears to have been the first to prepare an impure picrate of pyridyl-3-carbinol by boiling 3-bromo-picoline-picrate with water. Panizzon (Helvetica Chimica Acta, vol. 24, year 1941, p. 24E to 28E), by passing by the hydrazide and the benzene-sulfonyl derivative thereof, transformed nicotinic acid into the pyridyl-3-aldehyde and reduced the latter to pyridyl-3-carbinol. The method characterised by splitting nicotinyl-benzene-sulfo-hydrazide according to McFadyen and Stevens (Journal of the Chemical Society London, year 1936, pages 584 to 587; Chemisches Zentralblatt, vol. II, year 1936, p. 779) is not well suited for the preparation of large quantities of the aldehyde. According to a paper by Prelog et al. (Helvetica Chimica Acta, vol. 29, year 1946, pages 684 to 692) pyridyl-3-carbinol may also be obtained by transforming nicotinic acid into nicotinic-thiolic acid methyl ester and desulfurising the same by the aid of Raney-nickel. This method, too, does not well lend itself to the preparation of larger quantities of carbinol.

It has now been found, according to the present invention, that pyridyl-3-carbinol may be prepared from the easily obtainable 3-aminomethyl-pyridine (Helvetica Chimica Acta, vol. 20, year 1937, pages 690 to 691; Journal of the American Chemical Society, vol. 63, year 1941, pages 490 to 492) by treating this substance, under acid reaction conditions, with a nitrite.

If 3-aminomethyl-pyridine is reacted, in the usual manner, in mineral acid solution with an alkali-nitrite, the pyridyl-3-carbinol yield is low; the said yield may, however, be raised considerably by appropriate adaptation of the reaction conditions. For instance, it is advisable to carry out the reaction at a low temperature. When using an alkali nitrite in aqueous solution, it is advantageous to carry out the reaction in the presence of an aliphatic carboxylic acid; thus, yields amounting to 63 to 82 per cent. of the theoretical are, for instance, arrived at by treating the formate, the oxalate or the acetate of 3-aminomethyl-pyridine with the nitrite.

The pyridyl-3-carbinol thus obtained is intended for use in pharmaceutical preparations.

Example 1

207 parts by weight of sodium nitrite are dissolved in 360 parts of water and then slowly added, while stirring and cooling to less than —5° C., to a solution of 324 parts by weight of 3-aminomethyl-pyridine and 360 parts by weight of acetic acid in 1200 parts of water. Stirring at 0° C. is continued for one hour whereupon the colorless liquid is left to stand at room temperature for several hours and finally heated for 1 hour to 70° C. while introducing carbon-dioxide. After cooling down, the mixture is saturated with solid potassium carbonate and extracted several times with chloroform; the united extracts are dried with potassium carbonate, the solvents are driven off and the residue is carefully fractionated in vacuo. Under a pressure of 16 mm. Hg pyridyl-3-carbinol passes over at 145° C. as a colorless oil. From the small amount of first-runnings, mainly consisting of 3-acetoxymethyl-pyridine ( boiling point 119° C. under a pressure of 12 mm. Hg), additional quantities of pyridyl-3-carbinol may be obtained in the usual manner by treatment with alcoholic potassium hydroxide. The yield of pyridyl-3-carbinol amounts to 82 per cent. of the theoretical.

Example 2

A solution of 34.5 parts by weight of sodium nitrite in 60 parts of water is reacted with a mixture of 54 parts by weight of 3-aminomethyl-pyridine, 46 parts by weight of formic acid and 200 parts of water in accordance with the method described in Example 1. Upon working up, pyridyl-3-carbinol is obtained, the yield amounting to 65 per cent. of the theoretical.

Example 3

54 parts by weight of 3-aminomethyl-pyridine and 45 parts by weight of oxalic acid are dissolved in 200 parts of water. A solution of 34.5 parts by weight of sodium nitrite in 60 parts of water is added while stirring and cooling to —8° C. The pyridyl-3-carbinol is worked up in accordance with the indications in Example 1; the yield amounts to 63 per cent. of the theoretical.

I claim:

1. A process which comprises reacting 3-aminomethyl-pyridine with an alkali nitrite and a water-soluble aliphatic carboxylic acid in water to produce pyridyl-3-carbinol.

2. A process as in claim 1 wherein the acid is is acetic acid.

3. A process as in claim 1 wherein the acid is formic acid.

4. A process as in claim 1 wherein the acid is oxalic acid.

5. A process as in claim 1 in which the reaction is carried out at a low temperature.

6. A process which comprises reacting 3-aminomethyl-pyridine with sodium nitrite and acetic acid in water to produce pyridyl-3-carbinol.

7. A process which comprises reacting 3-aminomethyl-pyridine with sodium nitrite and formic acid in water to produce pyridyl-3-carbinol.

8. A process which comprises reacting 3-aminomethyl-pyridine with sodium nitrite and oxalic acid in water to produce pyridyl-3-carbinol.

REINHARD SCHLÄPFER.

REFERENCES CITED

The following references are of record in the file of this patent:

UNITED STATES PATENTS

| Number | Name | Date |
|---|---|---|
| 2,266,754 | Harris | Dec. 23, 1941 |
| 2,359,260 | Szabo | Sept. 26, 1944 |
| 2,410,531 | Szabo | Nov. 5, 1946 |

OTHER REFERENCES

Graf, Chem. Abstracts, vol. 30, p. 7576.
Graf, J. fur Practische Chemie, vol. 146, pp. 88–104.